United States Patent [19]

Fedders et al.

[11] 4,288,409

[45] Sep. 8, 1981

[54] TUBULAR REACTOR FOR CARRYING OUT CATALYTIC PROCESSES

[75] Inventors: Heinrich Fedders, Jülich; Willi Beckers, Übach-Palenberg, both of Fed. Rep. of Germany

[73] Assignee: Kernforschungsanlage Jülich Gesellschaft mit beschränkter Haftung, Jülich, Fed. Rep. of Germany

[21] Appl. No.: 90,532

[22] Filed: Nov. 2, 1979

[30] Foreign Application Priority Data

Nov. 6, 1978 [DE] Fed. Rep. of Germany ....... 2848086

[51] Int. Cl.³ ............................................... B01J 8/06
[52] U.S. Cl. .................................... 422/219; 422/190
[58] Field of Search ............... 422/190, 191, 193, 197, 422/211, 219, 221, 239, 170, 171, 177, 181, 192

[56] References Cited

U.S. PATENT DOCUMENTS

| 2,193,816 | 3/1940 | Houdry | 422/219 X |
| 2,646,391 | 7/1953 | Houdry | 422/191 X |
| 2,911,291 | 11/1959 | Engel | 422/191 |
| 4,180,543 | 12/1979 | Ward | 422/191 X |

*Primary Examiner*—William A. Cuchlinski, Jr.
*Attorney, Agent, or Firm*—Becker & Becker, Inc.

[57] ABSTRACT

A tubular reactor, especially for carrying out catalytic processes at high temperatures, wherein the tubular reaction zone is substantially occupied by the catalysts. The catalyst can be withdrawn in its entirety from the reactor tube, is surrounded by a gas-permeable envelope, and is supported by a longitudinal carrier. Preferably, the carrier is formed by a central tube serving for a heat exchanging passage of reaction gas and the envelope is subdivided into a series of closely consecutive catalyst filled baskets each including a wire mesh side wall having perforated front plates, all baskets being threaded on and supported by the central tube.

1 Claim, 6 Drawing Figures

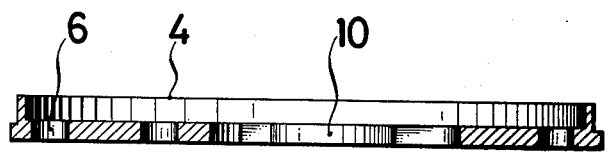
FIG. 2
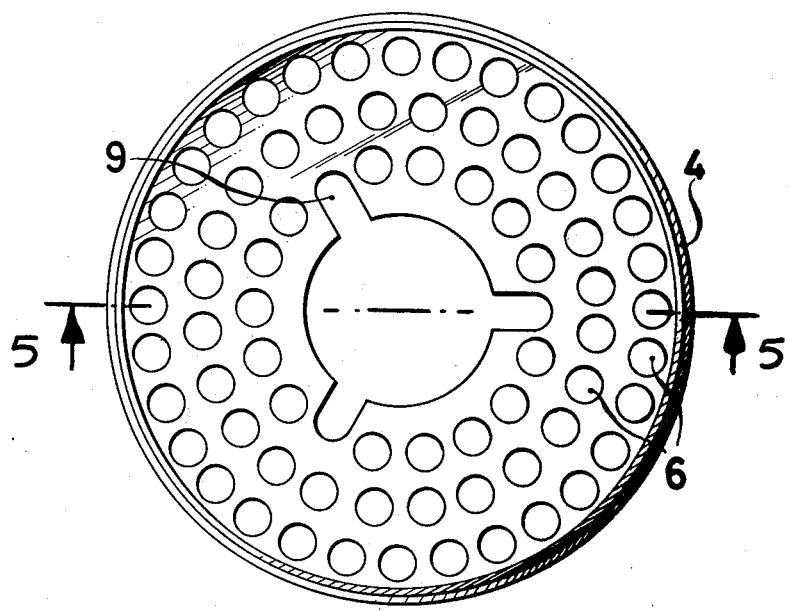

TUBULAR REACTOR FOR CARRYING OUT CATALYTIC PROCESSES

The present invention relates to a tubular reactor, especially for carrying out catalytic processes with a predetermined quantity of catalysts, whereby the reaction zone of the reactor is substantially filled by the catalyst. The catalyst quantity can be withdrawn from the reactor tube in its entirety.

Tubular reactors filled with a catalyst are widely used for catalytic processes. A particular example is the reforming of hydrocarbons which is carried out in so-called reactor tubes or cracking tubes or collimator. In such tubes or conduits of conventional installations, catalytic particles, usually so-called Raschig-rings, are provided and the process gas is flowed through the conduits.

Since the catalytic activity of the catalyst decreases due to various reasons, it has to be replaced from time to time. This exchange or replacement is difficult due to the substantial length of the reactor tubes, for example 10 to 15 meter long tubes of small diameter, e.g. $d_1 < 130$ mm, and attendant problems are aggravated by a possible jamming of individual catalyst bodies for high temperature reactions.

Because of these reasons, an arrangement has already been developed in which the Raschig-rings are sequentially placed on pins, or are needled onto pins as it were, which pins project radially outwardly from the central carrying conduit or tube. However, practice has shown that when removing the catalyst arrangement, due to jamming or broken Raschig-rings, operational disruptions occur.

In accordance with another development, perforated discs made of catalytic material were continuously placed on a central tube. However, in comparison with the random distribution of a Raschig-ring filling, these discs exhibit a lower reaction efficiency. Furthermore, transfer of the heat from the reaction zone, containing the catalyst, to the central tube or duct, which serves as supply line or for the withdrawal of reaction gas is substantially determined by the discs which are in contact with the central tube, and, accordingly, heat transfer is considerably reduced or retarded.

It is an object of the present invention, accordingly, to provide a tubular reactor for catalytic processes, which is relatively simple, wherein the required replacement of the catalyst can be carried out relatively quickly, which avoids to a great extent fracture of the catalysts, and in which preferably conventional catalyst bodies, particularly Raschig-rings, can be used in advantageous distribution.

These objects and other objects and advantages of the invention will appear more clearly from the following specification in connection with the accompanying drawings, in which:

FIG. 2 is a top plan view of a lower end plate for the container in accordance with FIG. 1;

FIG. 5 is a cross section through the end plate in accordance with FIG. 2; and

Figure 1:
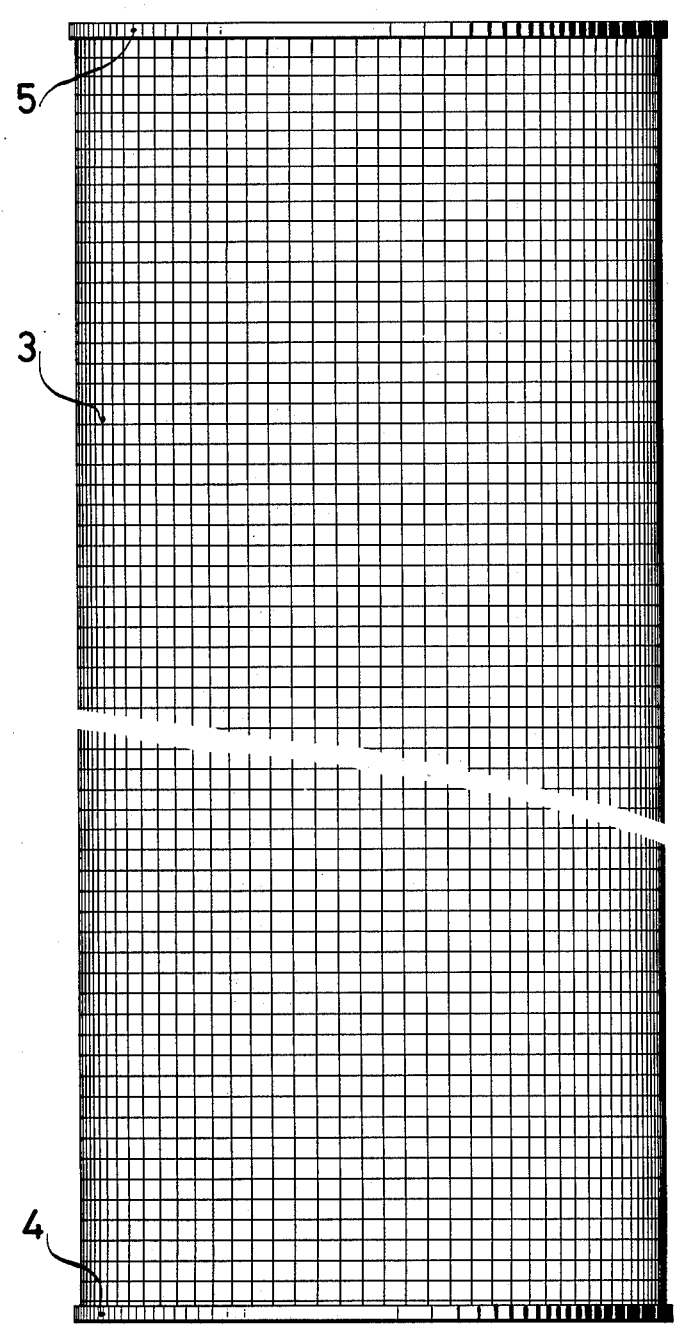
FIG. 1 is a side elevational view of a container for one embodiment of the tubular reactor in accordance with the present invention.
Figure 6:
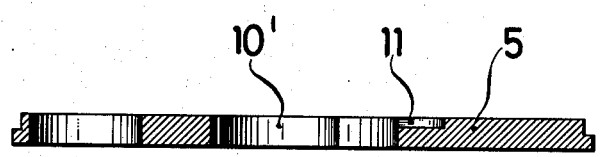
FIG. 6 is a cross section along line 6—6 in FIG. 3.
Figure 3:
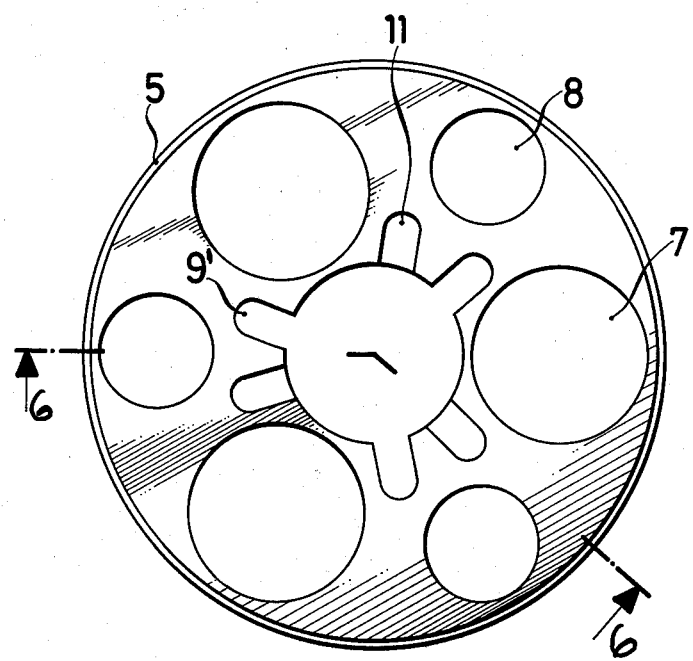
FIG. 3 is a bottom plan view of an upper end plate for a container in accordance with FIG. 1.

The invention is characterized primarily therein that the catalysts are surrounded by a gas-permeable means which is held by a longitudinal carrier member.

In accordance with a preferred embodiment of the invention, the catalyst bed is surrounded by an open mesh structure or basket with the basket being provided at the upper end and at the lower end with perforated end plates, and subdividing perforated plates can be intermediately arranged between the top end plate and the bottom end plate.

The longitudinal carrier member can basically be comprised of any longitudinally stable arrangement such as, for example, by one or several rods. In accordance with a preferred embodiment, however, the carrier member is a removable central tube which not only serves to support the open mesh structure mechanically, but also serves purposes of the reaction, for example, preheating of the process gas.

The intermediate dividing plates serving as stiffening members are arranged essentially perpendicular to the axis and spaced apart from one another along the longitudinal central axis of the tubular reactor for mechanically rigidifying the structure and to retard the occurrence of eccentricities. These plates are generally to be understood to include transverse mechanical, gas-permeable reinforcing means. These can be in the form of perforated discs or in the form of other means, for example, a corresponding rigidifying lattice-type structure or grating, and the like. In the most simple case, when only low thermal and mechanical demands are made, the dividing plates are in the form of perforated or lattice-type discs intermittently introduced into the gas-permeable envelope when introducing the catalyst and being arranged, in accordance with a preferred embodiment around a retractable central (gas) tube, serving as the supporting or carrier member. The basket or envelope could be tightly secured to the carrier member (before or after infeed of the catalyst) for example by welding or preferably fitted to it by means resulting in a fixed relation between envelope and carrier member during reactor operation as well as catalyst retraction.

Any gas-permeable surrounding means can be used which ensures a cohesiveness of the bed. Particularly advantageous, however, is a container or envelope formed of an open wire mesh which is somewhat resilient so that jamming of the catalyst bed or any part of it is avoided even when the reactor is heated.

In a practical embodiment of the tubular reactor in accordance with the invention, care has to be taken that a certain shifting of the catalyst arrangement, even at a considerable heat, can occur, without, however, producing gaps (within the arrangement and in the direction towards the tube) which would detrimentally affect the maximally feasible uniform contact between the gas flowing through the reactor tube and the catalyst.

In accordance with a preferred embodiment, several baskets are used which are arranged on a central carrying tube whereby each basket or container is in the form of a wire mesh cylinder with the ends of a cylinder being closed by perforated discs. It has been shown that this subdivision by means of individual containers has considerable advantages because loading of the baskets or containers with catalysts is simplified in this manner, and mechanical problems which could arise at a greater length are avoided. The presently optimal length of a basket or container is of the order of 1 m; of course, however, individual containers of a greater length could be made. Thus, the length should be in conformity with the thermal and mechanical behavior of the baskets on the basis of the selected reaction conditions. The distance between individual containers is preferably held small whereby the axial gap is primarily to accommodate the expansion due to heat of the individual containers.

Assembly of an embodiment including a central carrying tube on which are arranged individual wire mesh containers of cylindrical shape having perforated end plates is relatively simple. Such assembly is relatively simple because the containers are individually placed on the central tube having projecting supports, which supports are preferably aligned in relation to one another. The perforated end plates directly secured to the wire mesh (for reasons of simplicity) are provided with slots for the transmission or passage of the pertaining supports. Then after reaching the lowermost free support member, or members, of the central tube, the individual container is rotated until it engages the support member with its pertaining lock(s) or depression(s) in the upper perforated end plate. The container is then filled by feeding catalysts through the holes in the upper plate.

The lower perforated discs or end plates serve to retain the catalyst bed. The upper end plates serve, for one, to support the container and, secondly, to mechanically rigidify the container or basket. The holes in the upper plate through which the catalyst is introduced are rather great in dimension to simplify loading and to present no barrier to movement of process gas. On the other hand, the end plates should remain of sufficient strength to fulfill their mechanical objects.

It is preferred that the support members of one niveau or level are pins or tenons distributed uniformly about the periphery of the central tube and which are dimensioned so that they are adapted to support a container. At the same time in circumferential direction they are to be narrow, so that the pertaining transmission slots of the lower plates do not disturb the sieve-bottom effect of these lower perforated end plates. Most advantageous are three relatively high, in circumferential direction narrow, pins which project radially up to about ⅓ of the radial dimension of the containers. The number of support members or pins, however, can be greater or can be smaller.

The arrangement and shape of the containers can be readily understood by referring now particularly to the drawings showing the presently preferred embodiment of the invention.

According to this embodiment, "baskets" or containers 2, threaded or lined up, in spaced relation on a central, vertically extending tube, duct or conduit 1, have a cylindrical shape and are made of an open mesh, e.g. wire mesh. These cylindrical shapes generally designated by numeral 3 are provided with perforated discs or end plates 4 and 5 and are adapted to slidingly fit (for example with a play of about 2 mm) in the reaction tube, not shown.

Figure 4:
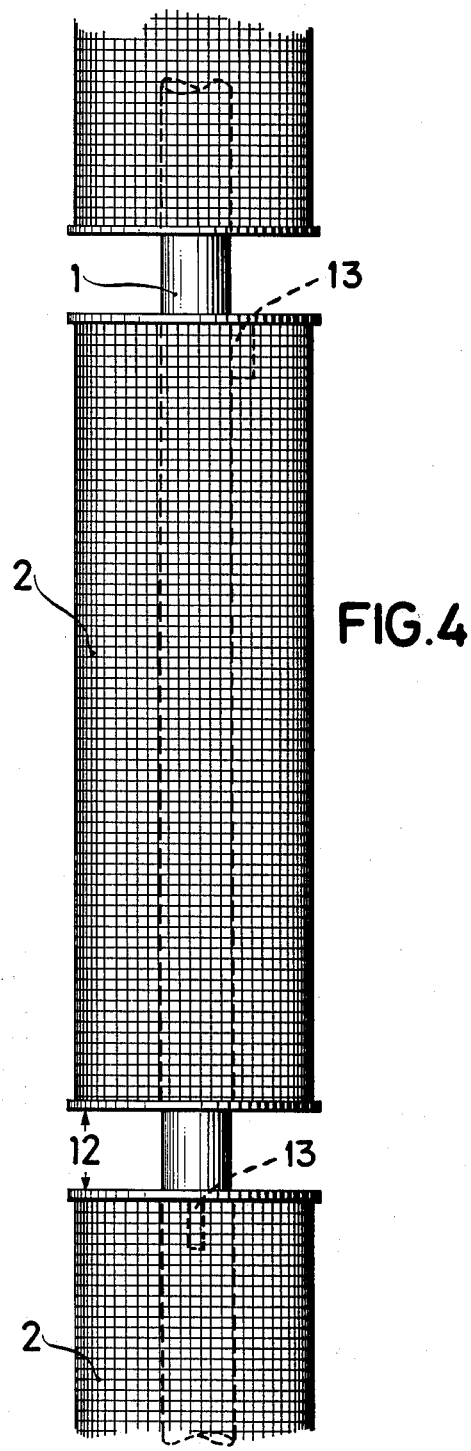
FIG. 4 is a side elevational view indicating several containers arranged about a central conduit.

The bottom disc or plate 4 serves as a sieve bottom for the filled-in catalysts (not shown) which are subjected during the operation of the reactor to a flow of gas passing from the top to the bottom through the vertical arrangement of catalyst baskets surrounding the central tube 1, as indicated in FIGS. 1 and 4.

The lower disc or plate 4 has holes 6 smaller than the chunks of the catalyst which allow a substantially unobstructed exit of gas. Disc 4 also has a central passage 10 and slots 9 extending from the central passage 10 radially outwardly.

The holes 7 of the upper disc or plate 5 are rather large to simplify loading of the container with catalysts. In addition to holes 7, intermediate holes 8 are arranged adjacent to cam transmission slots 9' and engaging or stop grooves 11 in the upper disc 5, whereby gas entry is substantially effected over the full cross section of disc 5. The slots 9' extend from the central bore 10' radially outwardly while the stop grooves 11 face into the basket 2 and extend only partially through the top disc or plate 5.

The slots 9 and 9' serve to freely line up the containers 2 on the central conduit 1, which is over its length repeatedly provided with circumferentially arranged radially projecting space support members or keys 13 respectively matching with the transmission slots 9, 9' as well as the engaging grooves 11; the axial distance of the support members should thus be adapted to the desired axial distance of the upper end plates 5 of the successive containers 2. By means of a short rotation these support members are engaging in the matching grooves 11 of the disc 5 to lock the container relative to the conduit 1 (during reactor operation as well as catalyst retraction). The two perforated discs 4 and 5 for strengthening the wire mesh cylinder 3 are securely connected to the cylinder, preferably by welding.

Preferably the axial distance (or gap) 12 between two consecutive containers 2 is to be small so that the reactor volume is utilized to the fullest extent. On the other hand, the distance 12 should be sufficient to allow for expansion of the containers 2 due to heat.

The support members of the central conduit 1 are securely fastened thereto, preferably by welding. In the arrangement shown, the central conduit or tube 1 is of 30 mm diameter, and is provided, for each container 2, with three support members uniformly arranged about the circumference. Each support member is of about 5 mm width, 20 mm height, and about 8–10 mm radial dimension. Each support member corresponds to one of the "cam slots" 9, 9' (which preferably are aligned to one another) as well as to one of the engaging grooves 11. In a pilot device, ten (10) baskets 2 are sequentially arranged in the reactor tube (diameter 100 mm), the full length of which amounts to 12 m, the individual baskets having a length of 1 m.

The arrangement in accordance with the invention allows a relatively quick removal of the catalyst in the case of long, narrow tubular reactors. The distribution of the catalyst corresponds essentially to the usual (random) catalyst filling and the reduction of the volume of catalyst, because of the containers, perforated discs, and gaps 12 need not be of concern. Accordingly, with this arrangement advantageous reaction yields are achieved together with a convenient heat control by supply or removal of the reaction gas through the central conduit or tube. Furthermore, reaction hampering cracks or fractures of the catalytic bodies (which lead to migration of catalytic material in the region outside the actual reaction zone and which would cause inverse reactions there) are substantially prevented.

The central tube together with the catalyst baskets is removable from the reactor tube by retraction through the upper end of the reactor; detachable connections between the central tube and the reactor tube are preferably provided outside the reaction zone. When the central tube serves for a discharge of reaction gas, its lower end is in open connection to or communication with, the lower exit of the reactor tube.

The present invention is, of course, in no way restricted to the specific disclosure of the specification and drawings, but also encompasses any modifications within the scope of the appended claims.

What we claim is:

1. A tubular reactor for containing solid catalyst configured in chunks of a certain minimum diameter, the reactor comprising:

a vertical tubular support with spaced keys projecting therefrom;

a plurality of wire mesh baskets for containing said chunks each of said baskets having a top and bottom and each enclosing an unobstructed circular area, said baskets being mounted vertically on the tubular support in spaced relation with respect to one another and being supported by one of said keys;

a top end plate for enclosing the top of each basket, said top end plate having a central opening conforming to the tube, at least one radially projecting slot extending into the plate from the central opening for allowing the key on the tube to pass through; at least one radially projecting stop groove extending into the plate and being angularly spaced from the first slot, the stop groove extending only partially through the plate and facing into the basket whereby one key on the tube rests in the stop groove for supporting the basket on the tube; the top plate further including a plurality of openings therein larger in diameter than the chunks whereby the baskets can be filled through the top plate, and a bottom plate secured to the bottom of the basket, said bottom plate having an opening therethrough with at least one radial key slot whereby the basket may be slid down the tube while clearing the keys, and a plurality of holes in the bottom plate smaller in diameter than the chunks to thereby support the chunks while allowing fluid to flow through the bottom plate.

* * * * *